ent Office 2,957,867
Patented Oct. 25, 1960

2,957,867

1,5-BENZODIAZEPIN-4-ONES AND PROCESS OF PRODUCING SAME

Lincoln Harvey Werner, Summit, N.J., assignor to Ciba Pharmaceutical Products Inc., Summit, N.J., a corporation of New Jersey No Drawing. Filed June 23, 1958, Ser. No. 743,980

11 Claims. (Cl. 260—239)

The present invention relates to new 1,5-benzodiazepine compounds. More particularly it relates to 2-$R_1$-3-$R_2$-5-tertiary amino-lower alkyl-3,4-dihydro-1,5-benzodiazepin-4-ones, in which each of the radicals $R_1$ and $R_2$ stands for hydrogen or a hydrocarbon radical, and the salts and quaternary ammonium compounds thereof.

The radical $R_1$ and $R_2$, apart from representing hydrogen, stand for lower aliphatic hydrocarbon radicals, such as lower alkyl, e.g. methyl, ethyl, n-propyl, isopropyl, n-butyl, isobutyl, secondary butyl or tertiary butyl; or lower alkenyl, e.g. vinyl, allyl or methallyl; aryl-lower alkyl radicals such as monocyclic aryl-lower alkyl radicals, e.g. benzyl or phenylethyl; or particularly $R_1$, aryl radicals, such as monocyclic aryl radicals, e.g. phenyl, or bicyclic aryl radicals, e.g. 1-naphthyl or 2-naphthyl radical. $R_2$ stands primarily for hydrogen. These hydrocarbon radicals may be unsubstituted or may be substituted; aliphatic hydrocarbon radicals may contain amino groups, for example, tertiary amino groups, such as N,N-di-lower alkyl-amino groups, e.g. dimethylamino, diethylamino or dipropylamino; N-lower alkyl-N-lower cycloalkylamino groups, e.g. N-methyl N-cyclopentyl-amino; or N,N-lower alkylene-imino groups, e.g. pyrrolidino, piperidino, morpholino or a piperazino group; hydroxyl groups; etherified hydroxyl groups, such as lower alkoxy groups, e.g. methoxy or ethoxy; esterified hydroxyl groups, such as acyloxy groups, e.g. ethoxyformyloxy or acetoxy. Aryl radicals may contain in addition to the above-mentioned substituents lower alkyl groups, e.g. methyl; nitro groups; primary amino groups; secondary amino groups, such as lower alkyl-amino, e.g. methyl-amino, or halogen atoms, e.g. fluorine, chlorine or bromine. One or several such substituents may be present.

The lower alkyl portion of a tertiary amino-lower alkyl group in the 5-position of the 1,5-benzodiazepine nucleus contains from two to seven carbon atoms and may be represented by a lower alkylene radical, such as, for example, 1,2-ethylene, 1,3-propylene, 1,2-propylene, 1,4-butylene, 1,3-butylene, 1,2-butylene, 2,3-butylene, 1,5-pentylene or 1,4-pentylene. The lower alkylene radical or part of it may also be incorporated into a saturated heterocyclic ring system containing the tertiary amino group as a ring member.

Tertiary amino groups are particularly N,N-di-lower hydrocarbon-amino or N,N-lower alkylene-imino groups. Lower hydrocarbon radicals of an N,N-di-lower hydrocarbon-amino group are, for example, lower alkyl, lower alkenyl, lower cycloalkyl, aryl or aralkyl radicals containing from one to seven carbon atoms, e.g. methyl, ethyl, propyl, isopropyl, butyl, isobutyl, pentyl, neopentyl, allyl, methylallyl, cyclopentyl, cyclohexyl, phenyl or benzyl. Therefore, such N,N-di-lower hydrocarbon-amino groups are represented, for example, by dimethylamino, diethylamino, dipropylamino, N-methyl-N-cyclopentylamino or N-methyl-N-benzylamino groups. The lower alkylene radicals of an N,N-lower alkylene-imino group contain from four to six carbon atoms which may be arranged in a carbon chain, or such carbon chain may be interrupted by a hetero atom such as nitrogen, sulfur or oxygen and form an aza-, thia- or oxa-lower alkylene radical. Together with the nitrogen atom such lower alkylene radicals represent, for example, pyrrolidino radicals, e.g. pyrrolidino or 2-methyl-pyrrolidino; piperidino radicals, e.g. piperidino, 2-methyl-piperidino, 3-methyl-piperidino, 4-methyl-piperidino, 3-hydroxy-piperidino, 3-acetoxy-piperidino or 3-hydroxy-methyl-piperidino; hexamethyleneimino, morpholino, thiamorpholino or piperazino radicals, e.g. 4-methyl-piperazino, 4-hydroxy-ethyl-piperazino or 4-acetoxyethyl-piperazino. The tertiary amino-lower alkyl radical may also be represented by a heterocyclic radical, in which the tertiary amino group is part of the heterocycle and one of the carbon atoms of the heterocyclic ring is connected directly or through a lower alkylene radical, e.g. methylene or 1,2-ethylene, with the 1,5-benzodiazepine ring. Such radicals are, for example, a 1-methyl-piperidino-(3)-methyl or a 1-methyl-piperidino-(4) radical.

The 1,2-phenylene radical fused onto the 1,5-benzodiazepine ring may be unsubstituted or substituted by one or several substituents, such as one or several of those outlined for the radicals $R_1$ and $R_2$, for example, lower alkyl, nitro, primary amino, secondary amino, tertiary amino, hydroxyl, etherified hydroxyl, esterified hydroxyl or halogen, for which group specific members are given hereinabove.

Salts of the new compounds of this invention are particularly therapeutically useful acid addition salts, for example, those with inorganic acids, such as, hydrohalic acids, e.g. hydrochloric or hydrobromic acid; nitric or thiocyanic acid; or sulfuric or phosphoric acids; or those with organic acids, such as, formic, acetic, propionic, glycolic, lactic, pyruvic, oxalic, malonic, succinic, maleic, fumaric, malic, tartaric, citric, ascorbic, hydroxymaleic, dihydroxy-maleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, methane sulfonic, ethane sulfonic, hydroxyethane sulfonic, benzene sulfonic, p-toluene sulfonic, napthalene sulfonic or sulfanilic acid or methionine, tryptophane, lysine or arginine. Salts, which may be particularly used for identification purposes, are those with acidic organic nitro compounds, e.g. picric, picrolonic or flavianic acid; or with metal complex acids, e.g. phosphotungstic, phosphomolybdic, chloroplatinic or Reinecke acid. Mono or polysalts may be formed depending on the number of salt-forming groups and/or on the conditions used for the formation of the salts.

Quaternary ammonium compounds of the 1,5-benzodiazepine derivatives of this invention are those with reactive esters formed by hydroxylated compounds with strong acids, such as those with lower alkyl halides, e.g. methyl chloride, methyl bromide, methyl iodide, ethyl chloride, ethyl bromide, ethyl iodide, propyl chloride, propyl bromide or isopropyl chloride; lower alkyl lower alkane sulfonates, e.g. methyl or ethyl methane sulfonate or ethane sulfonate; di-lower alkyl sulfates, e.g. dimethyl sulfate or diethyl sulfate; or with lower alkyl aryl sulfonates, e.g. methyl p-toluene sulfonate. Also included as quaternary ammonium compounds are the quaternary ammonium hydroxides, and the salts obtained by reacting such quaternary ammonium hydroxides with inorganic or, particularly, with organic acids, such as with those outlined hereinbefore as being suitable for the preparation of acid addition salts. Mono- or polyquaternary ammonium compounds may be formed depending on the number of tertiary amino groups and/or on the conditions used for the quaternization.

The new 1,5-benzodiazepine derivatives of this invention, their salts and quaternary ammonium compounds exhibit analgesic properties and may be used to alleviate pain, for example, in postoperative states or in painful chronic conditions, such as rheumatic disorders. Particularly useful as analgesic agents are 2-monocyclic aryl-5-N,N-di-lower alkyl-amino-lower alkyl-3,4-dihydro-1,5-benzodiazepin-4-ones and 2-monocyclic aryl-5-N,N-lower alkylene - imino-lower alkyl-3,4-dihydro-1,5-benzodiazepin-4-ones, in which the monocyclic aryl and/or the 1,2-phenylene radical of the 1,5-benzodiazepine nucleus may be unsubstituted or substituted by one or several substituents, for example, by methyl, methoxy, nitro, amino, chlorine or bromine, and their therapeutically useful acid addition salts. Representing this group of compounds is the 2-phenyl-5-(2-dimethylaminopropyl)-3,4-dihydro-1,5-benzodiazepin-4-one of the formula

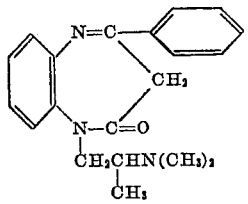

and the salts with mineral acids, e.g. hydrochloric acid, or with hydroxy-carboxylic acids, e.g. tartaric acid.

The new compounds of this invention may be used as medicaments in the form of pharmaceutical preparations, which contain the new compounds, salts or quaternary ammonium compounds thereof in admixture with a pharmaceutical organic or inorganic, solid or liquid carrier suitable for enteral e.g. oral, or parenteral administration. For making up the preparations there may be employed substances which do not react with the new compounds, such as water, gelatine, lactose, starches, magnesium stearate, talc, vegetable oils, benzyl, alcohols, gums, polyalkylene glycols, petroleum jelly or any other known carrier used for the preparation of medicaments. The pharmaceutical preparations may be in solid form, for example, as tablets, dragees or capsules, or in liquid form, for example, as solutions emulsions or suspensions. If desired, they may contain auxiliary substances, such as preserving agents, stabilizing agents wetting or emulsifying agents, salts for varying the osmotic pressure or buffers. They may also contain, in combination, other therapeutically useful substances.

The 3,4-dihydro-1,5-benzodiazepin-4-ones of this invention may also be used as intermediates for the preparation of the corresponding 2-$R_1$-3-$R_2$-5-tertiary amino-lower alkyl-1,2,3,4-tetrahydro-1,5-benzodiazepin-4-ones, in which $R_1$ and $R_2$, as well as the tertiary amino lower alkyl radical have the above given meaning and in which the 1-position of the 1,5-diazepine nucleus may be unsubstituted or substituted, for example, by a lower aliphatic hydrocarbon, such as lower alkyl, e.g. methyl or ethyl, and the salts and quaternary ammonium compounds thereof. These 1,2,3,4 - tetrahydro-1,5-benzodiazepine derivatives exhibit themselves analgesic properties and can be used to alleviate pain, if desired, in the form of pharmaceutical preparations manufactured as outlined above. They are new and are intended to be included within the scope of the invention.

They may be prepared by reducing the nitrogen-carbon double bond in 1,2-position of a 2-$R_1$-3-$R_2$-5-tertiary amino - lower alkyl-3,4-dihydro-1,5-benzodiazepin-4-one, in which $R_1$ and $R_2$ have the above-given meaning, or a salt thereof, and, if desired, converting an unsubstituted nitrogen atom in 1-position into a substituted nitrogen atom, and/or, if desired, converting a resulting salt into a free base, and/or, if desired, converting a resulting free base into a salt or a quaternary ammonium compound thereof. Suitable reducing agents are, for example, alkali metal borohydrides, such as lithium, sodium or potassium borohydride, used in a lower alkanol, e.g. methanol or ethanol, solution, in an aqueous mixture of such lower alkanols, in an ether, e.g. diethylene glycol dimethylether, or in an acid amide, e.g. dimethylformamide. The reduction may also be carried out by treatment with hydrogen in the presence of a catalyst containing a metal of the eighth group of the periodic system, such as palladium, e.g. palladium on charcoal, in the presence of a solvent, such as one of those outlined hereinabove.

These 2-$R_1$-3-$R_2$-5-tertiary amino-lower alkyl-1,2,3,4-tetrahydro-1,5-benzodiazepin-4-ones may also be prepared by introducing the tertiary amino-lower alkyl radical into a 2-$R_1$-3-$R_2$-1,2,3,4-tetrahydro-1,5-benzodiazepin-4-one, in which the nitrogen atom in the 1-position is unsubstituted or substituted as outlined before and the nitrogen atom in 5-position is unsubstituted. The radical may be introduced, for example, by forming an alkali metal, e.g. lithium, sodium or potassium, salt of the 2-$R_1$-3-$R_2$-1,2,3,4-tetrahydro-1,5-benzodiazepin-4-one, and treating such salt with a reactive ester formed by a tertiary amino-lower alkanol with a strong inorganic or organic acid, or a salt thereof, as outlined in details herein below.

An unsubstituted nitrogen atom in the 1 position of a 2-$R_1$-3-$R_2$-5-tertiary amino-lower alkyl-1,2,3,4-tetrahydro-1,5-benzodiazepin-4-one may be substituted according to any procedure suitable for the substitution of a secondary aromatic amino group. Salts and quaternary ammonium compounds of these 1,2,3,4-tetrahydro-1,5-benzodiazepine compounds may be prepared as outlined hereinbelow for the corresponding 3,4-dihydro-1,5-benzodiazepine derivatives.

The 2-$R_1$-3-$R_2$-5-tertiary amino-lower alkyl-3,4-dihydro-1,5-benzodiazepin-4-ones of this invention, in which $R_1$ and $R_2$ have the above given meaning, and their salts and the quaternary ammonium compounds may be conveniently prepared by introducing the tertiary amino-lower alkyl radical into a 2-$R_1$-3-$R_2$-3,4-dihydro-1,5-benzodiazepin-4-one, in which the nitrogen atom in 5-position is unsubstituted, or a salt thereof and, if desired, converting a resulting salt into a free base, and/or, if desired, converting a free base into a salt or a quaternary ammonium compound thereof.

The introduction of a tertiary amino-lower alkyl radical into a 2-$R_1$-3-$R_2$-3,4-dihydro-1,5-benzodiazepin-4-one may be conveniently carried out by converting the latter into an alkali metal, e.g. lithium, sodium or potassium, salt and reacting such salt with the reactive ester of a tertiary amino-lower alkanol and a strong inorganic or organic acid, or a salt of such ester. An alkali metal salt may be formed by treating the R-$R_1$-R-$R_2$-3,4-dihydro-1,5-benzodiazepin-4-one with an alkali metal amide or hydride, e.g. lithium, sodium or potassium amide or hydride, in the presence of an inert organic solvent, such as, for example, an ether e.g. p-dioxane or diethylene glycol dimethylether, or an aromatic hydrocarbon, e.g. benzene, toluene or xylene. Also used may be an alkali metal e.g. lithium, sodium or potassium, in a lower alkanol, e.g. methanol, ethanol, n-propanol, isopropanol, n-butanol, isobutanol or tertiary butanol, or in liquid ammonia. The reactive ester of a tertiary amino-lower alkanol is preferably one formed with a hydrohalic acid, e.g. hydrochloric or hydrobromic acid. A tertiary amino-lower alkyl chloride is the preferred reagent. A salt of a reactive ester of a tertiary amino lower alkanol, though used to a lesser degree, is particularly a hydrohalide, e.g. hydrochloride or hydrobromide, thereof. The reaction is preferably carried out in the solvent which is used for the formation of the alkali metal salt, under cooling, at room temperature or at an elevated temperature, for example, at the boiling temperature of the solvent, under normal pressure or under increased pressure, and/or, if desired, in the atmosphere of an inert gas, e.g. nitrogen.

The starting materials used in the above reaction are known or may be prepared according to procedures used for the known analogs. For example, by reacting a 1,2- phenylenediamine or a salt thereof with an α-R$_1$-carbonyl-α-R$_2$-acetic acid, in which R$_1$ and R$_2$ have the above given meaning, or a reactive derivative thereof, for example, an ester, such as a lower alkyl, e.g. methyl or ethyl, ester thereof, or a halide, e.g. chloride, thereof, the desired 2-R$_1$-3-R$_2$-3,4-dihydro-1,5-benzodiazepin-4-one is formed. This reaction may be carried out in the presence of an organic solvent, such as an aromatic hydrocarbon, e.g. benzene, toluene or xylene; however, the yields are higher by performing the reaction in the absence of a solvent. The reaction mixture is preferably heated either to the boiling point of the solvent, or from about 50° C. to about 200° C. if no solvent is used.

Depending on the conditions used the new 1,5-benzodiazepine compounds of this invention are obtained in the form of the free bases or as the salts thereof. A salt may be converted into a free base in the customary way, for example, by reaction with an aqueous alkaline reagent, such as an alkali metal hydroxide, e.g. lithium, sodium or potassium hydroxide; an alkali metal carbonate, e.g. sodium or potassium carbonate or hydrogen carbonate; or ammonia. A free base may be transformed into its therapeutically useful acid addition salts by reaction with an appropriate inorganic or organic acid, for example, with one of the acids outlined hereinabove, for example, by treating a solution of the base in a lower alkanol e.g. methanol, ethanol, propanol or isopropanol; in ether, e.g. diethylether, or in a lower alkyl lower alkanoate, e.g. methyl or ethyl acetate, or in a mixture of such solvents with the acid or a solution thereof. The salts may also be obtained as the hydrates.

The new 1,5-benzodiazepine compounds of this invention may be converted into the quaternary ammonium compounds by reacting the tertiary bases with an ester formed by a hydroxylated lower hydrocarbon compound and a strong inorganic or organic acid. Hydroxylated lower hydrocarbon compounds contain from one to seven carbon atoms and the esters thereof are more especially those with mineral acids, e.g. hydrochloric, hydrobromic, hydriodic, or sulfuric acid. Such esters are specifically lower alkyl halides, e.g. methyl iodide, methyl bromide, methyl chloride, ethyl iodide, ethyl bromide, ethyl chloride, propyl chloride, propyl bromide or isopropyl chloride; lower alkyl lower alkane sulfonates, e.g. methyl or ethyl methane or ethane sulfonate; di-lower alkyl sulfates, e.g. dimethyl sulfate or diethyl sulfate; or lower alkyl aryl sulfonates, e.g. methyl p-toluene sulfonate. The quaternizing reactions, such as outlined above, may be performed under cooling, at room temperature or at an elevated temperature, at atmospheric pressure or in a closed vessel under increased pressure. Suitable solvents are more especially lower alkanols, e.g. methanol, ethanol, n-propanol, isopropanol, n-butanol, tertiary butanol or n-pentanol; lower alkanones, e.g. acetone or methyl ethyl ketone; or organic acid amides, e.g. formamide or dimethylformamide.

Quaternary ammonium compounds obtained may be converted into the corresponding quaternary ammonium hydroxides, for example, by reacting the quaternary ammonium halides with silver oxide, or the quaternary ammonium sulfates with barium hydroxide, by treating the quaternary ammonium salts with an anion exchanger, or by electrodialysis. From a resulting quaternary ammonium base there may be formed therapeutically suitable quaternary ammonium salts by reaction with acids, for example, with the inorganic or organic acids mentioned hereinbefore for the preparation of acid addition salts, or with mono-lower alkyl sulfates e.g. methyl or ethyl sulfate. A quaternary ammonium compound may also be converted directly into another quaternary ammonium salt without conversion into the quaternary ammonium hydroxide; for example, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The invention also comprises any modification of the general process wherein a compound obtainable as an intermediate at any stage of the process is used as the starting material and the remaining step(s) of the process is (are) carried out, as well as any new intermediates.

In the process of this invention such starting materials are preferably used which lead to final products mentioned in the beginning as preferred embodiments of the invention.

The following examples illustrate the invention; they are not to be construed as being limitations thereon. Temperatures are given in degrees centigrade.

*Example 1*

A solution of 6.9 g. of 2-phenyl-3,4-dihydro-1,5-benzodiazepin-4-one in 60 ml. of toluene is refluxed with 2.13 g. of a 55% suspension of sodamide in toluene for three hours. 4.0 g. of 2-dimethylaminopropyl chloride is added and refluxing is continued for eight additional hours. The reaction mixture is filtered, concentrated under reduced pressure and the residue dissolved in ether. The 2-phenyl-5-(2-dimethylaminopropyl)-3,4-dihydro-1,5-benzodiazepin-4-one hydrochloride is prepared by adding a solution of hydrogen chloride in ethylacetate and is purified by recrystallization from isopropanol, M.P. 98–100°; yield: 7.1 g.

By reacting an acetone solution of 2-phenyl-5-(2-dimethylaminopropyl)-3,4-dihydro - 1,5 - benzodiazepin-4-one, prepared from the corresponding hydrochloride by treatment with aqueous ammonia, followed by extraction with ether, with methyl iodide the 2-phenyl-5-(2-dimethylaminopropyl)-3,4-dihydro - 1,5 - benzodiazepin-4-one methiodide may be formed.

The 2-phenyl-5-(2-dimethylaminopropyl)-3,4-dihydro-1,5-benzodiazepin-4-one may be treated with sodium borohydride in diethyleneglycol dimethylether to yield the 2-phenyl - 5 - (2-dimethylaminopropyl)-1,2,3,4-tetrahydro-1,5-benzodiazepin-4-one.

*Example 2*

By substituting 3-dimethylaminopropyl chloride for the 2-dimethylaminopropyl chloride in Example 1, the 2-phenyl-5-(3 - dimethylaminopropyl) - 3,4 - dihydro - 1,5-benzodiazepin-4-one is obtained, which is characterized as the hydrochloride salt, M.P. 116–122° C.

*Example 3*

A solution of 14.1 g. of 2-phenyl-3,4-dihydro-1,5-benzodiazepin-4-one in 100 ml. of toluene is refluxed with 2.35 g. of sodamide for three hours. 8.9 g. of 2-diethylaminoethyl chloride is added and refluxing is continued for an additional six hours. After cooling, the reaction mixture is filtered, the solvent evaporated and the residue distilled under reduced pressure, B.P. 200–210°/0.2 mm. 11.5 g. of 2-phenyl-5-(2-diethylaminoethyl)-3,4-dihydro-1,5-benzodiazepin-4-one is dissolved in 200 ml. of ether and a solution of 5.13 g. of D-tartaric acid in 50 ml. of isopropanol is added to yield 6.4 g. of the 2-phenyl-5-(2-diethylaminoethyl)-3,4-dihydro - 1,5 - benzodiazepin - 4-one D-tartrate, M.P. 94–99°.

By treating 2-phenyl-3,4-dihydro-1,5-benzodiazepin-4-one with 2-piperidino-(N)-ethyl chloride or with 2-[4-methyl-piperazino-(N)]-ethyl chloride according to the procedure described in the examples the 2-phenyl-5-[2-piperidino - (N)-ethyl]-3,4-dihydro-1,5-benzodiazepin - 4-one and the 2-phenyl-5-{2-[4-methyl-piperazino-(N)]-ethyl}-3,4-dihydro-1,5-benzodiazepin-4-one, respectively, may be produced.

The 1,5-benzodiazepine compounds of this invention may also be prepared according to additional methods. For example, by treating an N-(tertiary amino-lower alkyl)-1,2-phenylene diamine or a salt thereof with an α-$R_1$-carbonyl-$R_2$-acetic acid, in which $R_1$ and $R_2$ have the above-given meaning, or with a reactive derivative of such an acid, for example, an ester, such as a lower alkyl, e.g. methyl or ethyl, ester, or an acid halide, e.g. chloride, the desired 2-$R_1$-3-$R_2$-3,4-dihydro-1,5-benzodiazepin-4-one derivative may be formed. This reaction may be carried out in the absence or presence of a solvent, for example, of an aromatic hydrocarbon, e.g. benzene, toluene or xylene, and, if desired, at an elevated temperature, for example, at the boiling temperature of the solvent, or, if no solvent is present, at from about 50° C. to about 200° C.

An additional method to prepare the desired 1,5-benzodiazepine derivatives consists in treating a 2-$R_1$-3-$R_2$-5-reactive esterified hydroxy-lower alkyl-3,4-dihydro-1,5-benzodiazepin-4-one, in which $R_1$ and $R_2$ have the above-given meaning, with a secondary amine or a salt thereof. A reactive esterified hydroxyl group is particularly a halogen, e.g. chlorine or bromine, atom; a secondary amine furnishes one of the tertiary amino groups described in detail hereinabove. The reaction is performed in the absence or, preferably, in the presence of a solvent, for example, an aliphatic hydrocarbon, e.g. hexane; an aromatic hydrocarbon e.g. benzene, toluene or xylene; or a lower alkanol, e.g. methanol or ethanol, and/or, if desired, in the presence of an acid neutralizing reagent, such as an alkali metal carbonate, e.g. sodium or potassium carbonate or hydrogen carbonate; or an organic tertiary base, such as, a nitrogen heterocyclic compound, e.g. pyridine or collidine. The temperature may be elevated, if desired, to the boiling point of the solvent or of the secondary amine.

In addition, in a resulting 2-$R_1$-3-$R_2$-5-tertiary amino-lower alkyl-3,4-dihydro-1,5-benzodiazepin-4-one any substituents present may be converted into other substituents and/or additional substituents may be introduced. Thus, if $R_2$ stands for hydrogen, a 2-$R_1$-5-tertiary amino-lower alkyl-3,4-dihydro-1,5-benzodiazepin-4-one may be reacted with a compound containing a reactive carbonyl group, such as, for example, an aldehyde or a ketone, or with a reagent capable of introducing a hydrocarbon radical, such as an aliphatic hydrocarbon halide, which reaction may be subsequent to a formation of an alkali metal salt.

Any functional groups attached to any aliphatic and/or aromatic portions of a 1,5-benzodiazepine compound may be converted into other functional groups: a nitro group may be reduced to an amino group; a nitro or a primary amino group may be reductively alkylated to form secondary or tertiary amino groups; an amino group may be diazotized and converted to halogen according to the Sandmeyer method; a hydroxyl group may be etherified, for example, by treatment with a diazo-lower alkane, e.g. diazomethane, or esterified to a lower alkanoyloxy group, for example, with acetyl chloride to an acetoxy group, etc.

What is claimed is:
1. A member of the group consisting of 2-$R_1$-3-$R_2$-5-tertiary amino-lower alkyl-3,4-dihydro-1,5-benzodiazepin-4-ones, in which each of the radicals $R_1$ and $R_2$ stands for a member of the group consisting of hydrogen, lower alkyl, lower alkenyl, phenyl, naphthyl, and phenyl-lower alkyl, and tertiary amino represents a member of the group consisting of N,N-di-lower alkyl-amino, pyrrolidino, piperidino, hexamethyleneimino, morpholino, thiamorpholino and 4-methyl-piperazino, therapeutically acceptable acid addition salts thereof and lower alkyl quaternary ammonium halides, sulfate and sulfonates thereof.

2. A member of the group consisting of 2-$R_1$-3-$R_2$-5-tertiary amino-lower alkyl-1,2,3,4-tetrahydro-1,5-benzodiazepin-4-ones, in which each of the radicals $R_1$ and $R_2$ stands for a member of the group consisting of hydrogen, lower alkyl, lower alkenyl, phenyl, naphthyl, and phenyl-lower alkyl, and tertiary amino represents a member of the group consisting of N,N-di-lower alkyl-amino, pyrrolidino, piperidino, hexamethyleneimino, morpholino, thiamorpholino and 4-methyl-piperazino, therapeutically acceptable acid addition salts thereof and lower alkyl quaternary ammonium halides, sulfate and sulfonates thereof.

3. 2-phenyl-5-N,N-di-lower alkyl-amino-lower alkyl-3,4-dihydro-1,5-benzodiazepin-4-ones.

4. 2-phenyl-5-(2-dimethylaminopropyl)-3,4-dihydro-1,5-benzodiazepin-4-one.

5. 2-phenyl-5-(3-dimethylaminopropyl)-3,4-dihydro-1,5-benzodiazepin-4-one.

6. 2-phenyl-5-(2-diethylaminoethyl)-3,4-dihydro-1,5-benzodiazepin-4-one.

7. 2-phenyl-5-[2-piperidino-(1)-ethyl]-3,4-dihydro-1,5-benzodiazepin-4-one.

8. 2-phenyl-5-{2-[4-methyl-piperazino-(1)]-ethyl}-3,4-dihydro-1,5-benzodiazepin-4-one.

9. Process for the preparation of 2-phenyl-5-N,N-di-lower alkyl-amino-lower alkyl-3,4-dihydro-1,5-benzodiazepin-4-ones, which comprises treating the sodium salt of a 2-phenyl-3,4-dihydro-1,5-benzodiazepin-4-one with a N,N-di-lower alkylamino-lower alkyl chloride in an inert organic solvent.

10. 2-phenyl-5-N,N,di-lower alkyl-amino-lower alkyl-1,2,3,4-tetrahydro-1,5-benzodiazepin-4-one.

11. 2-phenyl-5-(2-dimethylaminopropyl)-1,2,3,4-tetrahydro-1,5-benzodiazepin-4-one.

References Cited in the file of this patent

Ried et al.: Chemische Berichte, vol. 89, pp. 1101–1106 (1953).

UNITED STATES PATENT OFFICE
CERTIFICATION OF CORRECTION

Patent No. 2,957,867                             October 25, 1960

Lincoln Harvey Werner

It is hereby certified that error appears in the above numbered patent requiring correction and that the said Letters Patent should read as corrected below.

Column 4, line 50, for "$R-R_1-R-R_2$" read -- $2-R_1-3-R_2$ --.

Signed and sealed this 6th day of June 1961.

(SEAL)
Attest:

ERNEST W. SWIDER                           DAVID L. LADD
Attesting Officer                             Commissioner of Patents